June 23, 1936.  R. HELLBACH  2,045,466
APPARATUS FOR HEATING AT CONTROLLED TEMPERATURES
Filed March 29, 1935
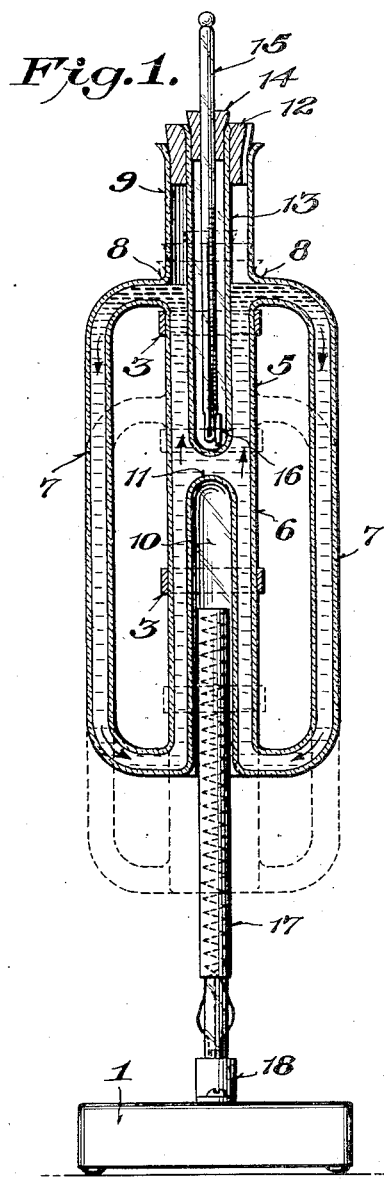
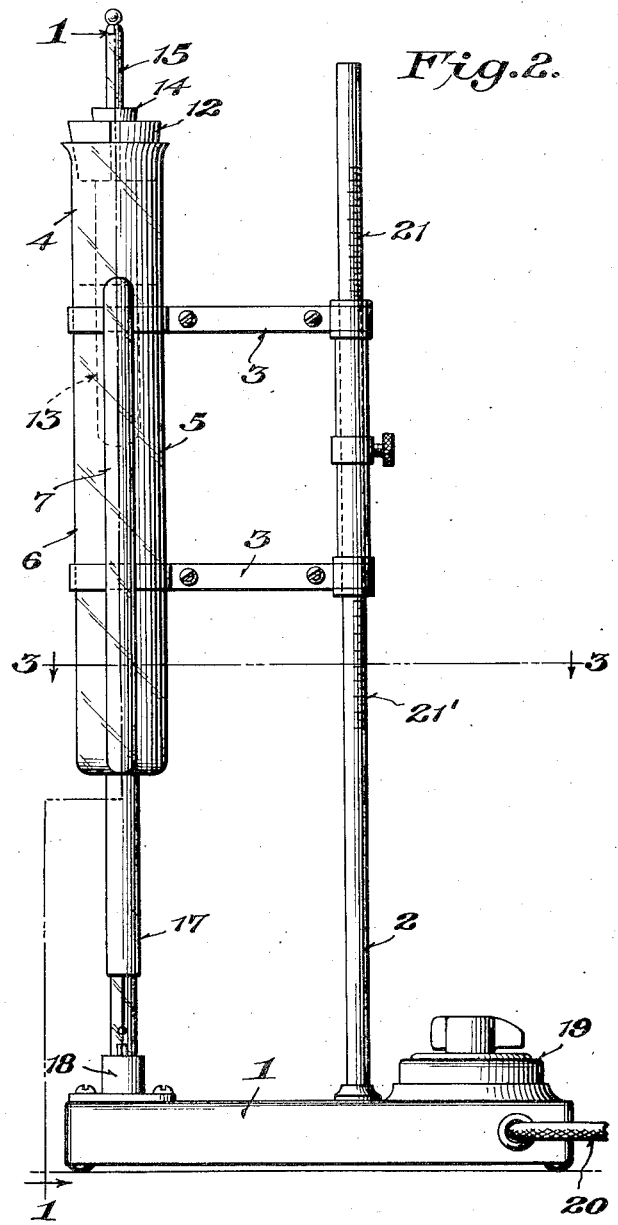
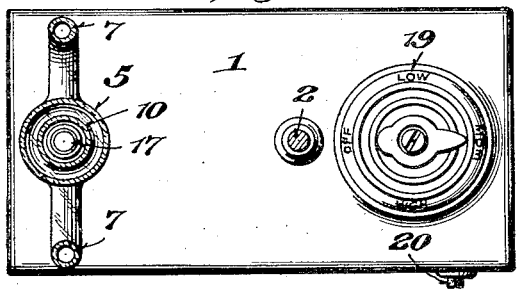
Inventor
*Rudolph Hellbach,*
By *Moncure B. Berg*
Attorney Patented June 23, 1936

2,045,466

UNITED STATES PATENT OFFICE 2,045,466

APPARATUS FOR HEATING AT CONTROLLED TEMPERATURES

Rudolph Hellbach, Washington, D. C.

Application March 29, 1935, Serial No. 13,789

4 Claims. (Cl. 219—38)

The invention relates to heating and more particularly has reference to a method of temperature control for heating apparatus and also to the apparatus itself.

Methods and devices have been developed for heating a fluid and circulating the same around a container or compartment having a solid, semi-solid, liquid, or gas therein for the purpose of warming or heating the latter and raising its temperature to a predetermined degree or through a predetermined temperature range. However, such devices and methods possess a number of disadvantages, the principal one residing in the lack of suitable regulation of the heat applied to the circulating fluid so that it is difficult to obtain a sensitive temperature control for the contents of the container undergoing heating. This is due to the use of means external to the device itself for varying the temperature of the circulating fluid, as for example external electrical resistance remote from the heating element or where other heating mediums are employed such as gas, oil and the like, external means for varying the intensity of the heat generated and supplied to the apparatus. Also such apparatus as heretofore used has generally been cumbersome and has possessed an attendant lack of simplicity of design and operation.

It is hence the major object of this invention to provide a heating method and apparatus for carrying out the same which lack the disadvantages inherent in methods and devices of this nature heretofore employed by the art.

An equally important object of this invention is to provide a heating process of such character that a sensitive temperature control may be obtained around and within a heating compartment.

Another object of the invention is to provide a heating apparatus which is formed with a heating compartment which latter is adjustably separable with respect to a heat source.

Still another object of the invention is to design a heating apparatus having a fluid compartment or container with a heating compartment immersed therein, the heating compartment holding the substance, gas or liquid undergoing heating, said fluid and also the heating compartment being movable towards and away from a heat source.

Yet another object of the invention is the provision of a heating apparatus whereby a controlled and substantially constant temperature, at any one instant, is obtained around a heating compartment, controlled variation of the temperature being effected by regulation of the intensity of the heat developed by a heat source and/or the adjustable movement of the heating compartment with respect to the heat source.

Yet a further object of the invention is a heating device which includes a fluid compartment movable with respect to a heat source, the fluid compartment having a body portion, a water leg, an extension portion and arms connecting the water leg and the body portion, the extension portion being adapted to support a removable heating compartment which latter extends within the body portion of the fluid compartment when the heating apparatus is assembled.

With these and other objects in view, which may be incident to my improvements, the invention consists in the method and the parts and the combinations of the device to be hereinafter set forth and claimed, with the understanding that the method steps and the several necessary elements, comprising my invention may be varied in order or may be varied in construction, proportion and arrangement without departing from the spirit of the invention and the scope of the appended claims.

As mentioned the invention covers a method of heating. Such process provides for circulating a heated fluid around a heating compartment and includes the steps of regulating the intensity of the heat generated by a heat source and/or adjusting the position of the heating compartment with respect to the heat source, both steps of the method providing an accurate temperature control for the heating compartment.

Briefly, one form of the apparatus for practically carrying out the invention comprehends the use of a tubular fluid compartment or container having a body portion provided with a water leg at one end and an extension portion at the other end for supporting a removable heating compartment, there also being arms connecting the water leg to the body portion. Upon filling the fluid container with a fluid and applying heat to the device, hot fluid will be circulated around the heating compartment which latter extends within the body portion of the fluid chamber. Where direct application of heat to the device is necessary, the use of a heating unit which can be regulated to give varying intensities of heat is contemplated. Further the invention comprehends an additional regulation of the heat imparted to the device and hence sensitive temperature control by adjustably mounting the fluid compartment (and hence the heating compartment carried by it) on a standard so that it may be adjusted at varying distances with respect to the heating unit. Through such means, a micro temperature adjustment is provided.

In order to make my invention more clearly understood, I have shown in the accompanying drawing, means for carrying the same into practical effect without limiting the improvements in their useful applications to the particular method and constructions which for the purpose of explanation, have been made the subject of illustration.

In the drawing:

Figure 1 is a front elevation of the device showing part of the same in section taken along the line 1—1 of Figure 2.

Figure 2 is a side elevation of the heating device used to carry out the invention.

Figure 3 is a sectional view of the device taken along the line 3—3 of Figure 2.

Throughout the drawing similar reference numerals refer to like parts.

As may be noted in the drawing, the device comprises a stand or base 1 having a standard 2 mounted thereon. Adjustably secured to the standard are clamps 3 which engage and support a fluid container or compartment 4 of the device. While the clamps are movable on the standard 2, they remain in fixed position with respect to the container so that their movement results in movement of the fluid container. If desired the two clamps may be tied together with cross pieces so as to make a more rigid construction.

The fluid container 4 consists of a body portion 5 having a water leg 6. At its lower end, as seen in Figure 1, the walls of the water leg are bent outwardly, thence upwardly to form tubular arms 7 which are bent inwardly near the top of the body portion so as to be connected therewith. However, as may be observed at 8, the outer wall of each tubular arm 7 is bent upwardly to form an extension portion 9 on the body portion of the fluid container.

By the construction just outlined it is possible to form the fluid chamber of one piece of material. Glass is a suitable construction material although a metal or a phenolic condensation product may be employed. Also all or any parts of the fluid chamber may be insulated with asbestos or other heat insulation. If the latter is done or opaque material is used to construct the fluid chamber a sight hole or window may be formed in the body 5 and extension 9 for reading a thermometer which is associated with the apparatus.

Of considerable importance is the fact that by design a tubular shaped space 10 is formed within the interior of the water leg of the fluid chamber. This space extends from the bottom of the water leg to the partial partition 11 in the body portion 5 which forms the top of the water leg.

By providing an extension 9 on the fluid chamber means are provided for supporting a removable heating compartment adapted to contain the material undergoing heating. This is accomplished by employing a cork or rubber stopper or other type of closure 12 which frictionally engages the mouth of the extension 9. Closure 12 is provided with an opening through which is inserted, removably so, a heating compartment or container 13, the outer surface thereof being frictionally engaged by the closure so as to support the compartment.

As shown the heating compartment is of test tube like shape and has its open end fitted with a closure member 14 similar to the member 12. A thermometer 15 is supported by the closure 14 so that it extends within the heating compartment, the support for the same being similarly effected as that of the heating compartment within the fluid compartment.

Instead of the frictional engaging means shown for supporting the closures 12 and 14 and the heating compartment and thermometer, other securing and supporting means may be employed. For example these members of the device may be screw threaded.

Thermometer 15, at the bulb end, has mounted thereon a carrier or capillary tube 16 which latter may be employed to contain a substance to be analyzed, if for example the device is used to determine melting points.

To be observed is the fact that compartment 13 extends well within the body portion of the fluid chamber. Thus it will be appreciated that on filling the fluid chamber with a suitable fluid, the thermometer bulb will be surrounded by it.

When it is desired to heat the fluid container, use is made of the heating element 17, mounted as at 18 on the base 1. The heater 17, which is of conventional design, is provided with a double wired heating coil which is connected to a switch 19, the latter being connected through a wire or lead 20 to a source of electric supply. Switch 19 is so constructed that three degrees of heat may be obtained from the heater, that is "low", "medium" and "high". Both wires of the element 17 are connected in series when the switch is in the "low" position, while on the "medium" position current flows through only one wire of the heater winding and for the "high" position of the switch both wires are connected in parallel. By means of the switch 19 controlled variation of the heat generated by the element 17 may be obtained. Of course if desired other types of heaters, such as gas, oil, coal and the like, may be employed.

Of extreme importance is the fact that the heater 17 is so mounted with respect to the fluid container, that on lowering the latter the heater is inserted within the opening 10 in the water leg. To put it another way, when the fluid compartment is lowered the heater extends within the water leg but outside of the inner walls thereof. The distance which the heater extends within the water leg may of course be varied by movement on the standard of the clamps which support the fluid compartment.

Frequently for both scientific and domestic purposes it is necessary to raise the temperature of some material, or gas, or liquid to a known degree or to slowly raise the temperature through a known or estimated temperature range. Devices heretofore employed for this purpose possess the disadvantage of inaccuracy, particularly that they heat so rapidly as to cause the temperature in a heating compartment to be raised far beyond that desired. This is due, primarily, to the lack of a sensitive temperature control, capable of micro-adjustment, and results from the use of a single control means which only regulates the intensity of the heat generated by a heating unit, such means being external of and remote from the device itself. For example, means for controlling a gas, oil, or coal flame or external electrical resistance for an electric heating element. Also devices of this nature are so constructed that they are possessed with the difficulty of evenly heating or evenly distributing the heat around the heating compartment.

The just described disadvantages are overcome by providing a heat control means capable of such micro-adjustment that known but minute temperature changes in the heating compartment may be obtained. This control means comprises the adjustability of the fluid compartment with respect to the heating unit, the switch 19 for regulating the heating unit and also the use of graduations 21 and 21' formed on the standard 2.

In use, the heater will be just below the fluid compartment or may extend all the way within the water leg. Hence, if the top of either clamp 3 is used as guide or marker for obtaining desired heights of the fluid compartment on the standard it will be appreciated that each graduation can be made to represent the maximum temperature attainable for the fluid around the heating compartment or the temperature within the heating compartment for any setting of the fluid compartment on the standard and the switch 19 in an "on" position. The distance between each graduation mark is made at a known interval and represents a certain number of degrees of temperature change.

Calibration of the standard may be readily accomplished when it is considered that if the fluid compartment is filled with a fluid, the latter on heating will be circulated in the direction of the arrows shown in Figure 1. The temperature of the fluid circulating around the heating compartment will eventually reach a maximum, which maximum once reached will remain substantially constant for any particular position of the fluid compartment on the standard and for any particular setting of the switch 19. By trying various positions of the fluid compartment and different settings of the switch, the standard may be calibrated.

Thus, several means are provided for controlling the temperature within the device, namely the movement of the fluid compartment with respect to the heating unit which allows the heating unit to be inserted within it, such movement being regulated by known graduations of distance designed to produce known temperatures within the heating compartment, and also the setting of the control switch 19 so as to produce various degrees of heating intensity of the heating unit.

If preferred the heater may be moved instead of the fluid compartment and the latter may be held stationary. However, in either event the relative movement between the heater and the fluid chamber will be the same so that similar heat and temperature control may be obtained. Also if wished suitable mechanism may be used to raise and lower the fluid compartment, or as just described, the heating unit.

For the purpose of illustration, the operation of the device will be described in connection with its use for determining melting points of various substances. In operation the closure 12 and compartment 13 are removed from the fluid compartment, which latter is then filled with a fluid to the approximate level indicated in Figure 1. Usually a liquid is employed for the working fluid although an inert gas may be used. Suitable liquids include "Nujol" or other mineral oil, sulphuric acid and a mixture of sulphuric acid and potassium bisulphate. Where temperatures below 100° C. are desired water may be used as the working fluid.

After filling the fluid compartment the thermometer 15 is removed and when used for determining melting points may have the capillary tube 16, associated therewith, filled with the substance to be analyzed. When all of this is accomplished the thermometer, heating compartment and closure 12 are placed in the fluid chamber in the positions shown in Figure 1 of the drawing.

Determination of the melting point may now be conducted. The fluid compartment, by aid of the graduations 21—21', is so positioned that the temperature around the testing compartment will produce a temperature in the heating compartment slightly less than estimated for the melting point of the substance being heated, and the heater switch is turned to an "on" position corresponding to the temperature setting. When the thermometer shows that the maximum temperature has been reached for the settings chosen, the fluid compartment is then lowered step by step so as to raise the temperature slowly to a point where the substance in the capilliary tube is caused to melt. When this occurs the thermometer is read.

The heat given off by the heating element warms the fluid adjacent thereto. This warmed fluid, by reason of convection, rises upwardly through the body portion of the fluid chamber and is returned to the water leg through the arms 7, the path of the fluid being indicated by the arrows in Figure 1. To be noted is the fact that the fluid circulates around the heating compartment and the substance undergoing heating so that the latter is evenly heated. Minute or micro changes in temperature are of course obtained in the manner already explained, namely by movement of the fluid compartment in accordance with the graduations on the standard 2.

Of the many purposes to which the device may be put, its use as a melting point tester has been chosen as best illustrating the facility of control of the temperature in the heating compartment. As is well known the physical properties of newly discovered substances may be roughly estimated from the known properties of similar existing substances. In the case of melting points for such newly discovered compounds, some temperature range can be given in which it may be expected that melting will occur. However, the exact melting point must be determined and the described apparatus permits the temperature to be slowly and evenly raised from the lower to the higher limit of the estimated range.

While the operation of the invention has been described in connection with the determination of melting points it is to be understood that the device may be employed for other purposes. For example in scientific laboratories the apparatus may be used as a water bath or a heater and for domestic uses it may be employed for purposes ranging from cooking to the heating of bath water.

If a gas is used as the working fluid in the apparatus a valve or pet cock may be placed in the body portion of the fluid chamber in order to facilitate filling the same. Where a liquid is employed as the working fluid a similar expedient may be practiced. Any inert gas may be employed, as for example air. On the use of a gas, operation of the device is similar to that already described.

To be appreciated is the fact that a plurality of sets of different colored graduations may be employed. Each set can be used to represent temperature changes for some particular working fluid, whether it be a gas or a liquid.

While I have shown and described the preferred method and embodiment of my invention, I wish it to be understood that I do not confine myself to the precise method steps or the details of construction herein set forth, by way of illustration, as it is apparent that many changes and variations may be made therein, by those skilled in the art, without departing from the spirit of the invention or exceeding the scope of the appended claims.

There is claimed:

1. A heating device comprising, a fluid compartment adapted to contain a fluid, the fluid compartment having a body portion provided with a water leg and also an extension portion for supporting a substance undergoing heating, a heat source, means for moving the fluid compartment with respect to the heat source, said heat source being so arranged that on movement of the fluid compartment the heat source may be made to extend within the water leg, and means for controlling the heat generated by the heat source.

2. A heating device comprising, a base, a standard mounted thereon, a fluid compartment for containing a fluid mounted on said standard, said fluid compartment having a body portion provided with a water leg and also an extension portion for supporting a substance undergoing heating, tubular arms connecting the water leg to the body portion adjacent the extension portion, a heat source so positioned that the fluid compartment may be moved over the same so as to surround it, means for moving the fluid compartment, and means for controlling the heat generated by the heat source.

3. A heating device comprising, a heat source and a fluid compartment for containing a fluid, the fluid compartment having a body portion provided with a water leg and also an extension portion for supporting a substance undergoing heating, said substance being so supported as to be surrounded by the fluid in the fluid compartment but not in contact with the same, means for controlling the heat generated by the heat source, means for moving the fluid compartment with respect to the heat source, and other means for so positioning the fluid compartment with respect to the heat source that the temperature imparted to the substance being heated may be raised to a known degree when the heat source has reached its maximum heating capacity for a particular setting of its control means.

4. A heating device comprising, a fluid compartment for containing a fluid, the fluid compartment having a body portion provided with a water leg and also an extension portion for supporting a substance undergoing heating, said substance being so supported as to be surrounded by but not in contact with said fluid, a heat source, means for controlling the heat generated thereby, means for moving the fluid compartment so that the heat source extends for desired distances within the water leg, and other means for so positioning the fluid compartment with respect to the heat source that the heat imparted to the substance will raise the same to a known degree of temperature when the heat source has reached its maximum heating capacity for a particular setting of its control means.

RUDOLPH HELLBACH.